US007081901B1

(12) United States Patent
Ludden et al.

(10) Patent No.: US 7,081,901 B1
(45) Date of Patent: Jul. 25, 2006

(54) DISPLAY SYSTEM WITH FRAMESTORE AND STOCHASTIC DITHERING

(75) Inventors: Christopher A. Ludden, Pittsford, NY (US); Jeffrey A. Small, Rochester, NY (US)

(73) Assignee: National Semiconductor Corporation, Santa Clara, CA (US)

( * ) Notice: Subject to any disclaimer, the term of this patent is extended or adjusted under 35 U.S.C. 154(b) by 88 days.

(21) Appl. No.: 10/404,607

(22) Filed: Mar. 31, 2003

Related U.S. Application Data

(63) Continuation-in-part of application No. 10/230,975, filed on Aug. 29, 2002.

(51) Int. Cl.

| | |
|---|---|
| ***H04N 1/405*** | (2006.01) |
| ***G06K 9/40*** | (2006.01) |
| ***B41J 2/315*** | (2006.01) |
| *H04N 1/409* | (2006.01) |
| *H04N 1/40* | (2006.01) |

(52) U.S. Cl. ...................... 345/596; 345/545; 345/547; 345/612; 358/3.14; 358/3.13; 358/3.19

(58) Field of Classification Search ........ 345/421–422, 345/428, 600, 611, 612, 618, 501, 530, 545, 345/546, 547, 596; 358/1.1, 3.14, 3.13, 3.16, 358/3.19, 3.23, 3.24, 3.26, 3.27, 532–536; 382/237, 266–275, 254; 347/183, 188, 12, 347/15

See application file for complete search history.

(56) References Cited

U.S. PATENT DOCUMENTS

| | | | | |
|---|---|---|---|---|
| 5,586,203 | A * | 12/1996 | Spaulding et al. | 382/270 |
| 5,594,839 | A * | 1/1997 | Shu | 358/1.9 |
| 5,699,079 | A * | 12/1997 | Gossett | 345/605 |
| 5,751,590 | A * | 5/1998 | Cannon et al. | 700/233 |
| 5,835,117 | A * | 11/1998 | Small | 347/183 |
| 6,347,160 | B1 * | 2/2002 | Cheung et al. | 382/260 |
| 6,424,431 | B1 * | 7/2002 | Ulichney et al. | 358/1.9 |
| 6,433,891 | B1 * | 8/2002 | Yu et al. | 358/1.9 |
| 6,608,702 | B1 * | 8/2003 | Urasawa | 358/3.2 |
| 2002/0005831 | A1 * | 1/2002 | Ishii | 345/89 |
| 2002/0005854 | A1 * | 1/2002 | Deering et al. | 345/596 |
| 2002/0190931 | A1 * | 12/2002 | Thebault et al. | 345/63 |

OTHER PUBLICATIONS

B. E. Bayer, *An Optimum Method for Two-Level Rendition of Continuous-Tone Pictures;* 1973; pp. 26-11-26-15.
PixTech The Field Emission Display Company; *Producing Gray Scale On A Monochrome FED Using Frame Rate Control;* Aug. 7, 1998; pp. 1-2; Application Note G002.
Robert Ulichney; *Digital Halftoning;* Published Apr. 1987; Chapter 8 Dithering with Blue Noise; pp. 233-238.

* cited by examiner

*Primary Examiner*—Wesner Sajous
(74) *Attorney, Agent, or Firm*—Merchant & Gould P.C.; Mark R. Hennings

(57) ABSTRACT

A display system provides stochastic dithering to image data for storage in a frame buffer for display. Dithering is used to reduce the size of the frame buffer and to reduce the complexity of the drive circuitry that is used to display an image. The bit depth of the frame buffer is reduced by spatially dithering image data before it is written into the frame buffer. Stochastic dither patterns (which are uncorrelated) are used to minimize adverse effects of the dither patterns within the displayed image.

25 Claims, 3 Drawing Sheets

DISPLAY SYSTEM WITH FRAMESTORE AND STOCHASTIC DITHERING

RELATED APPLICATIONS

This utility patent application is a continuation-in-part of U.S. patent application Ser. No. 10/230,975, filed Aug. 29, 2002, of which the benefit of the earlier filing date is hereby claimed under 35 U.S.C. §120, and which is hereby incorporated by reference.

FIELD OF THE INVENTION

The present invention relates generally to video display systems, and more particularly to spatially dithering image data for video display systems.

BACKGROUND OF THE INVENTION

The cost of a conventional display system may be lowered by reducing the number of tone scale levels of pixels within image data. An exemplary imaging system includes image data that is to be displayed may contain 24 bits of information, with eight bits each being reserved for red, green, and blue tone values. Many conventional display systems are able to display the image data at the color depth resolution at which the image data was stored A typical method for reducing the cost of a display system is to limit the resolution of the digital-to-analog converters that are used to produce a video signal. Thus, pixel tone values are truncated when the resolution of the tone values exceeds the resolution of the digital-to-analog converter used in a display system. However, truncated pixel tone values often result in perceptible, abrupt changes in tone in displayed images. Dithering may be used to reduce the perceptibility of using truncated pixel tone values.

SUMMARY OF THE INVENTION

The present invention is directed towards a display system that dithers image data for storage in a frame buffer for display, where the image data is dithered according to a stochastic dithering methodology. Dithering is used to reduce the size of the frame buffer and to reduce the complexity of the drive circuitry that is used to display an image. The bit depth of the frame buffer is reduced by spatially dithering image data before it is written into the frame buffer. Stochastic dither patterns are used to minimize adverse effects of dithering within the displayed image. Stochastic dither patterns (such as blue noise) or ordered pattern dithering (such as Bayer) can be used, although stochastic dithering typically produces more pleasing results than ordered pattern dithering.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
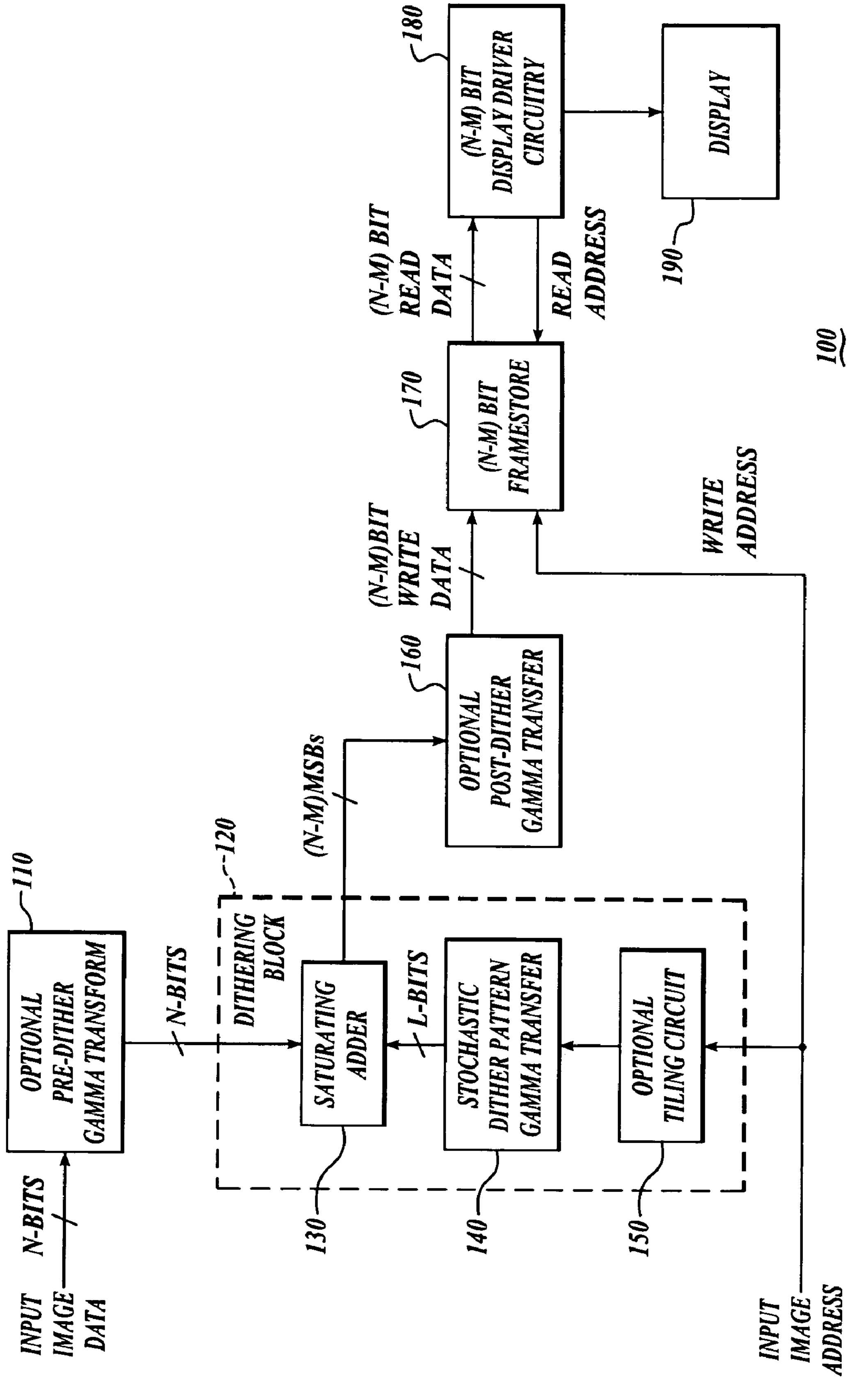
FIG. 1 is a schematic of a display system incorporating pre-framestore spatial stochastic dithering in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of “a,” “an,” and “the” includes plural reference, the meaning of “in” includes “in” and “on.” The term “connected” means a direct electrical connection between the items connected, without any intermediate devices. The term “coupled” means either a direct electrical connection between the items connected, or an indirect connection through one or more passive or active intermediary devices. The term “circuit” means either a single component or a multiplicity of components, either active and/or passive, that are coupled together to provide a desired function. The term “signal” means at least one current, voltage, or data signal. The term “stochastic dithering” includes dithering based on random and/or pseudo-random ordered dithering. Referring to the drawings, like numbers indicate like parts throughout the views.

The present invention is directed towards a display system that provides stochastic dithering to image data for storage in a frame buffer for display. Dithering is used to reduce the size of the frame buffer and the complexity of the drive circuitry that is used to display an image in accordance with the image data. The reduced size and complexity of the frame buffer memory and the drive circuitry has accompanying reductions in power requirements and cost. The bit depth of the frame buffer is reduced by spatially dithering the image data before the image data is written into the frame buffer. Stochastic dither patterns are used to minimize adverse effects of dithering within the displayed image, including minimizing detection of the dither patterns within the displayed images.

FIG. 1 is a schematic of a display system incorporating pre-framestore spatial stochastic dithering in accordance with the present invention. As shown in the figure, system 100 comprises optional pre-dither gamma transform 110, dithering block 120, optional post-dither gamma transform 160, framestore 170, display driver 180, and display 190. Dithering block 120 includes a saturating adder 130, stochastic dither pattern storage 140, and optional tiling circuit 150.

Although system 100 is useful for small format display applications having an integrated frame buffer, display controller, and column drivers, system 100 can be implemented in various other applications such as PDAs, digital still cameras, imaging systems, printing, and the like. System 100 can also be implemented as a hardware/software combination where dithering is accomplished using hardware (such as a baseband processor or image processing block) and/or software components. Furthermore, system 100 can be implemented by dithering images in accordance with the present invention (which reduces the size of the images) and embodying the dithered image in a software application. Not all functions are necessarily performed within a display module.

System 100 receives input image data that has pixel widths that are N-bits wide. The received input image data is applied to optional pre-dither gamma transform 110 (if present) where transforms, such as gamma processing, to the image data before any dithering is performed. Gamma processing may be used to adjust quantization levels associated with the image data. Quantization levels may be adjusted, for example, so that the viewable image represented by the image data can be displayed according to the sensitivity of the human vision system.

For gamma values near or below 1.0, dithering artifacts are more visible in darker regions of the image. For larger gamma values, dithering artifacts become more visible in lighter regions of the image. The input image data may be transformed into an optimal gamma representation that minimizes the visibility of dithering in all regions of the image.

Dithering block 120 receives the input image data (transformed or otherwise) for dithering and truncation of pixels associated with the input image data. Saturating adder 130 receives the input image data typically one pixel at a time. Saturating adder 130 receives dither values from stochastic dither pattern storage 140. (The selection of the dither values is described below with reference to optional tiling circuit 150.) Saturating adder 130 is a truncating adder that adds a received dither value to a tone value associated with a pixel from the received image data. In one example, dither values are retrieved having a bit depth "L" that is equal to the number of bits to be truncated ("M"). In another example, dither values are retrieved having a bit depth L that is greater than the number of bits to be truncated (M). The retrieved dither values are added to the tone value associated with a received pixel such that a dithered tone value is produced having a bit depth of "N-M" by truncating the lower M lsbs.

Dithering block 120 dithers the image data before dithered image data is stored in framestore 170, which allows the size of the frame store to be reduced. Reducing the size of the framestore reduces layout requirements, cost, heat, and operational power requirements. Framestore 170 provides the stored image data to display driver 180. The reduced bit depth of pixels also enables circuitry of display driver 180 to be reduced, which also reduces layout requirements, cost, heat, and operational power requirements.

Spatial dithering comprises spatially grouping pixels and varying individual pixel tone levels between adjacent brightness levels such that the average brightness of value for the pixels in a group remains unchanged relative to the original (un-dithered) image data. The human vision system perceives these averages rather than the individual pixel values. In this way, intermediate tone scales can be apparent in the display. Spatial dithering in accordance with the present invention may be used in additive color systems (such as displays) and in subtractive color systems (such as printing).

For example, a display system capable of displaying 18-bit color (6-bits or 64 tone levels per primary color) would normally employ 18 bits of memory for each pixel in the frame buffer and three 6-bit D/A converters for the driver circuit. If spatial stochastic dithering was employed to remove two bits per color, then an equivalent system could be implemented with 12 bits of memory for each pixel and three 4-bit D/A converters. This would provide a 33 percent reduction in memory size. For common D/A architectures used in display drivers, this would provide a 75 percent reduction in D/A circuitry (which reduces costs) and approximately a 75 percent reduction in D/A power dissipation.

The truncated dithered tone value is optionally processed by post-dithering gamma transform 160. Post-dithering gamma transform 160 applies transforms, such as gamma processing, after image data has been dithered. Post-dithering gamma transform 160 typically transforms image data in an inverse fashion to pre-dither gamma transform 110.

Framestore 170 is used to store image data for display driver 180. The display driver 180 may receive the image data synchronously or asynchronously with respect to the loading of the image data to framestore 170. (For example, framestore 170 may be dual-ported such that it can read from and written to simultaneously.) Display driver 180 conveys the received data from the stored image to display 190 in accordance with the capabilities of display 190.

Dithering block 120 typically receives an address (or an address that can be derived) for pixels, where each address is associated with a corresponding pixel of the image data. Optional tiling circuit 150, if present, receives the address and derives an index for selecting dithering values from a stored dither pattern. In one example, the dither pattern is tiled in two dimensions across the image. Tiling circuit 150 uses a selected number of least significant bits from a row within pixel address to select a row within the currently selected dither pattern. Tiling circuit 150 uses a selected number of least significant bits from a column within pixel address to select a column within the currently selected dither pattern. If the optional tiling logic 150 is not present, the entire row and column pixel addresses are used to select a row and a column within the dither pattern. The row and column addresses are arranged to select an address for a dither value from stochastic dither pattern storage 140. The selected dither value is added to a pixel from the input image data having the received address and truncated as described above.

Dither pattern storage 140 contains one or more stored dither patterns. Stochastic dither patterns containing relatively little low frequency content (i.e. "blue noise") are preferred because such patterns reduce the visibility of spatial artifacts that are produced by the dithering. Additionally, visible seams between the tiled patterns can be avoided by using dither patterns that do not produce visible seams when tiled. For example, blue noise dither patterns as described in U.S. Pat. No. 5,111,130 have this characteristic.

An algorithm suitable for generating stochastic dither patterns is described in U.S. Pat. No. 5,111,310, which is incorporated herein by reference.

Figure 2:
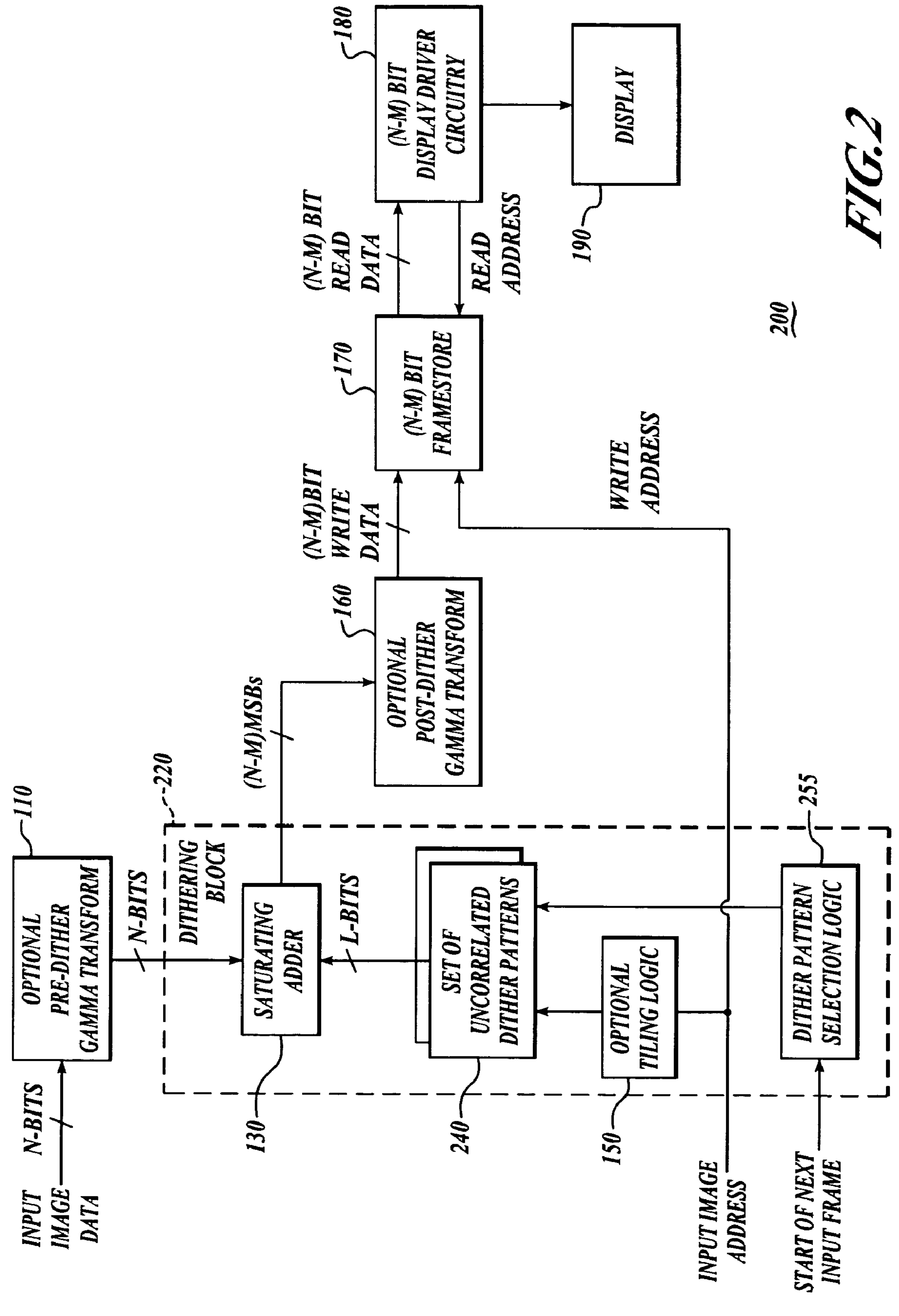
FIG. 2 is a schematic of a display system incorporating pre-framestore temporal stochastic dithering in accordance with the present invention.

FIG. 2 is a schematic of a display system incorporating pre-framestore temporal stochastic dithering in accordance with the present invention. System 200 operates in a similar fashion to system 100 except that temporal stochastic dithering is also performed. System 200 comprises dither block 220 that is configured to perform temporal dithering. Dithering block 220 comprises saturating adder 130, set of uncorrelated dither patterns 240, optional tiling logic 150, and dither pattern selection logic 255.

Temporal dithering involves changing dither patterns over time where (typically) a differing dither pattern is associated with a time period in which input image data is displayed. The time period may, for example, correspond to a trigger event such as framestore 170 receiving a frame of the image data. Framestore 170 may receive a stored frame, an update to the stored frame, or no update for each stored frame of image data that is displayed by display 190. Dither pattern selection logic 255 receives a signal that is associated with the start of a next input frame. In response to the received frame signal, dither pattern selection logic 255 usually selects a dither pattern from set of uncorrelated dither patterns 240 that is different from a currently selected uncorrelated dither pattern. Each successive uncorrelated dither pattern is selected such that the rate at which the patterns are changed is not noticeable to the human visual system (i.e., typically selected at a frame rate that is greater than about 15 fps).

Figure 3:
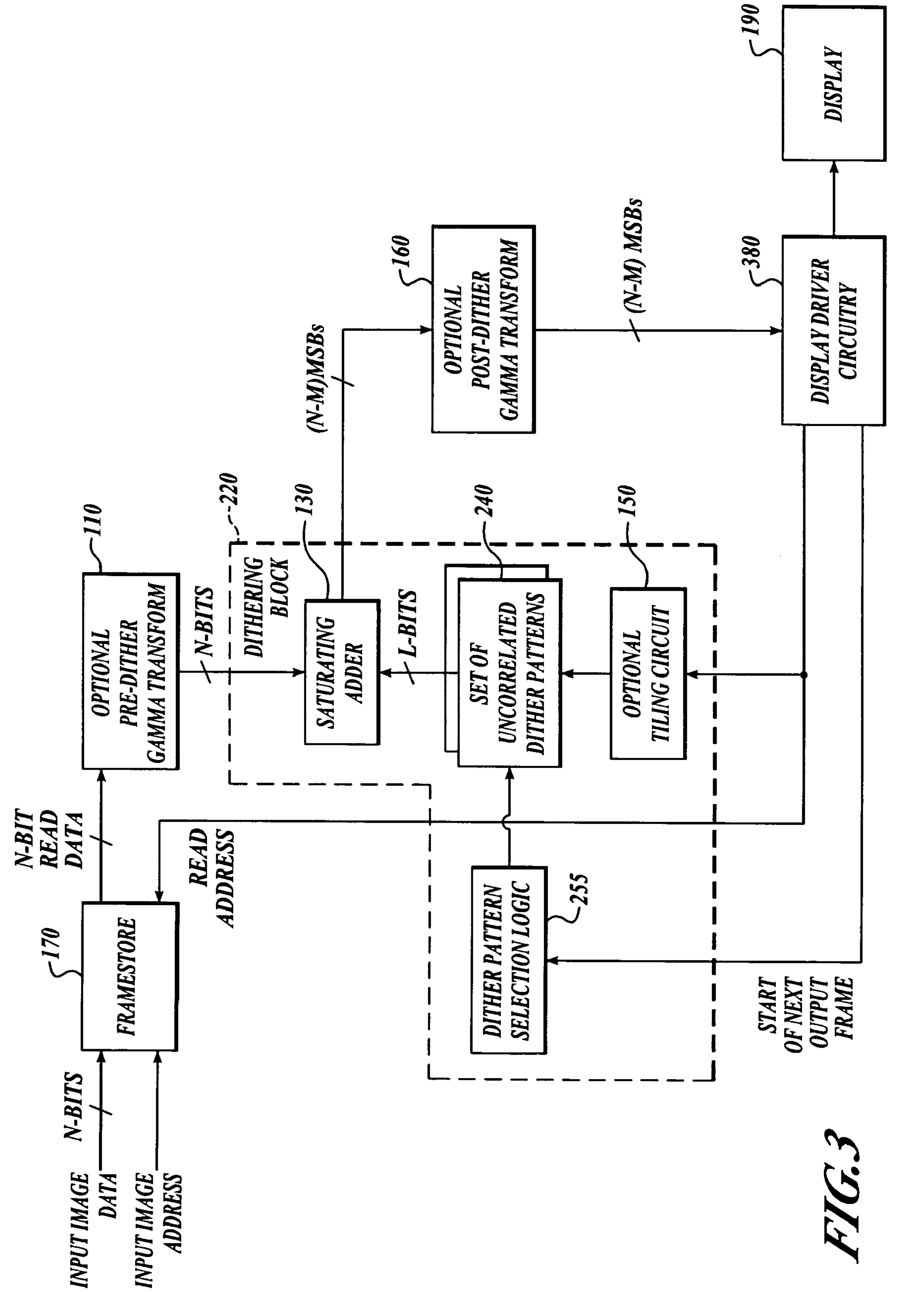
FIG. 3 is a schematic of a display system incorporating post-framestore temporal stochastic dithering in accordance with the present invention.

FIG. 3 is a schematic of a display system incorporating post-framestore temporal stochastic dithering in accordance with the present invention. System 300 operates in a similar fashion to system 200 except that temporal stochastic dithering is performed after image data is stored in framestore 170. Framestore is arranged before dithering block 220 in system 300. System 300 also comprises display driver 380, which, among other functions, is configured to provide a display refresh signal that is not necessarily correlated with the frame rate. Dither pattern selection logic 255 receives a signal that is associated with a temporal event (or "trigger" event such as the display refresh signal) in order to select a dither pattern. In response to the received trigger event, dither pattern selection logic 255 usually selects a dither pattern from set of uncorrelated dither patterns 240 that is different from a currently selected uncorrelated dither pattern. Temporal stochastic dithering after the framestore allows a reduction in the display drive circuitry, which has attendant cost and power savings. Using temporal stochastic dithering (as compared to non-temporal stochastic dithering alone) further reduces detection and perceptibility of the dithering.

Other embodiments of the invention are possible without departing from the spirit and scope of the invention. Image data pixels may be supplied in a predetermined order such that providing addresses with each pixel is not necessary for determining the location of the pixel for which the data image is supplied. When pixels are received in a predetermined order, a counter (for example) may be used to select values from a dither pattern.

In another example, stochastic dither patterns that are tiled can have pattern boundaries that are other than square or rectilinear pattern boundaries.

In another example, the system can display polychromatic data. For example, one dithering system can be provided for each individual color to the displayed. In an additive color system, a red system, a green system, and a blue system can be combined to produce an output signal that is suitable for driving a polychromatic display.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A display system for stochastic dithering, comprising:

a dither pattern store that is configured to provide a stochastic dither pattern;

a dithering block that is configured to dither pixels of an image provided to the display system and to reduce the bit depth of the pixels of the image such that dithered, truncated pixels are produced, wherein the dithering block includes a saturation adder that is arranged to add dithering information to the pixels; and a framestore that is configured to store the dithered, truncated pixels and that has a bit depth that is less than the bit depth of the pixels of the image provided for display.

2. The display system of claim 1, further comprising a display driver that is configured to receive the dithered pixels from the framestore.

3. The display system of claim 1, further comprising a pre-dither gamma transform that is configured to transform pixel values before they are processed by the dithering block.

4. The display system of claim 1, further comprising a post-dither gamma transform that is configured to transform pixel values after they are processed by the dithering block.

5. The display system of claim 1, further comprising tiling logic that is configured to tile a dither pattern that is smaller than the display resolution, over the entire image.

6. The display system of claim 1, wherein the stochastic dither pattern is a blue noise pattern.

7. The display system of claim 1, wherein the dithering block and the framestore are implemented using a common substrate.

8. The display system of claim 1, wherein the dither pattern store further comprises a set of uncorrelated dither patterns.

9. The display system of claim 8, further comprising a dither pattern selector that is configured to select temporally adjacent dither patterns such that the temporally adjacent dither patterns are uncorrelated.

10. The display system of claim 9, wherein the correlation between temporally adjacent dither patterns has diminished low spatial frequency energy content so as to be imperceptible by the human vision system.

11. The display system of claim 9, wherein the dithering block is positioned before the framestore so that the truncated, dithered pixels are stored in the framestore.

12. The display system of claim 9, wherein the dithering block is positioned after the framestore so that dithering and truncation of pixel values occur as the pixel values are read from the framestore.

13. A circuit for stochastic dithering, comprising:

means for receiving pixel data;

means for adding a selected dither value from a stochastic dither pattern to a selected pixel value from the pixel data to produce a dithered pixel;

means for truncating the dithered pixel to produce a truncated dithered pixel having a bit depth that is less than the bit depth of the received pixel value; and means for storing the truncated dithered pixel in a frame buffer memory having a bit depth that is less than the bit depth of the received pixel value.

14. The circuit of claim 13, further comprising means for storing a sequence of dithered pixels in a fame buffer.

15. The circuit of claim 13, further comprising means for selecting different stochastic dither patterns in response to a signal having a frequency that is greater than about 15 Hz to produce a temporally dithered image.

16. A method for stochastic dithering, comprising:

providing pixel data;

adding a selected dither value from a stochastic dither pattern to a selected pixel value from the pixel data to produce a dithered pixel;

truncating the dithered pixel to produce a truncated dithered pixel having a bit depth that is less than the bit depth of the received pixel value;

storing the truncated dithered pixel in a frame buffer memory having a bit depth that is less than the bit depth of the provided pixel data.

17. The method of claim 16, further comprising storing a sequence of dithered pixels in a frame buffer.

18. The method of claim 16, further comprising generating a dither pattern column address of the selected dither value in response to a column address that is associated with the selected pixel value, and generating a dither pattern row address of the selected dither value in response to a row address that is associated with the selected pixel value.

19. The method of claim 16, further comprising selecting different stochastic dither patterns in response to a trigger event to produce a temporally dithered image.

20. The method of claim 19, when the temporally dithered image is produced in response to a video stream.

21. A display system for stochastic dithering, comprising:

a dither pattern store that is configured to provide a stochastic dither pattern;

a dither pattern selector that is configured to select temporally adjacent dither patterns among a set of uncorrelated dither patterns;

a dithering block that is configured to dither pixels of an image provided to the display system based on the selected temporally adjacent dither patterns, and to reduce a bit depth of the pixels of the image such that dithered, truncated pixels are produced; and a framestore that is configured to store the dithered, truncated pixels and that has a bit depth that is less than the bit depth of the pixels of the image provided for display.

22. The display system of claim 21, when the correlation between temporally adjacent dither patterns has diminished low spatial frequency energy content so as to be imperceptible by the human vision system.

23. The display system of claim 21, wherein the dithering block is positioned before the framestore so that the truncated, dithered pixels are stored in the framestore.

24. The display system of claim 21, wherein the dithering block is positioned after the framestore so that dithering and truncation of pixel values occur as the pixel values are read from the framestore.

25. The display system of claim 21, further comprising tiling logic that is configured to tile a dither pattern that is smaller than the display resolution, over the entire image.

* * * * *

UNITED STATES PATENT AND TRADEMARK OFFICE

CERTIFICATE OF CORRECTION

PATENT NO. : 7,081,901 B1
APPLICATION NO. : 10/404607
DATED : July 25, 2006
INVENTOR(S) : Christopher A. Ludden et al.

It is certified that error appears in the above-identified patent and that said Letters Patent is hereby corrected as shown below:

Column 6, Line 55, change “fame” to --frame--.

Signed and Sealed this

Thirty-first Day of October, 2006

JON W. DUDAS
*Director of the United States Patent and Trademark Office*